L. PRINCE.
Dumping-Car.

No. 208,634. Patented Oct. 1, 1878.

WITNESSES: INVENTOR:
W. W. Hollingsworth Louis Prince
BY
ATTORNEYS.

UNITED STATES PATENT OFFICE.

LOUIS PRINCE, OF NASHVILLE, OHIO.

IMPROVEMENT IN DUMPING-CARS.

Specification forming part of Letters Patent No. 208,634, dated October 1, 1878; application filed September 19, 1878.

*To all whom it may concern:*

Be it known that I, LOUIS PRINCE, of Nashville, in the county of Holmes and State of Ohio, have invented a new and useful Improvement in Means for Unloading Railway Platform-Cars; and I do hereby declare that the following is a full, clear, and exact description of the same.

The object of my invention is to enable gondola or platform cars to be unloaded or discharged of their freight with ease and dispatch. To this end I apply to such cars, or to a detachable frame resting thereon, a truck or wheeled false platform, which is capable of being shifted laterally, and has a series of tilting floor-section or traps, on which the freight is deposited; and I also hinge to the sides of the cars, or to the aforesaid detachable frame resting thereon, a series of cranes, which may be swung laterally when required to support the trucks while discharging their freight. The freight is loaded on the flat floors of the said truck or false platform in the usual manner, and when the cars arrive at their destination each truck is shifted or moved laterally on the cranes until all or a part of its pivoted floor-sections overhang the side or are clear of the car, when said sections are tilted and the freight discharged. For the purpose of moving the trucks I employ a windlass and rope, attached to the cars or detachable frames in the manner hereinafter described.

Figure 1:
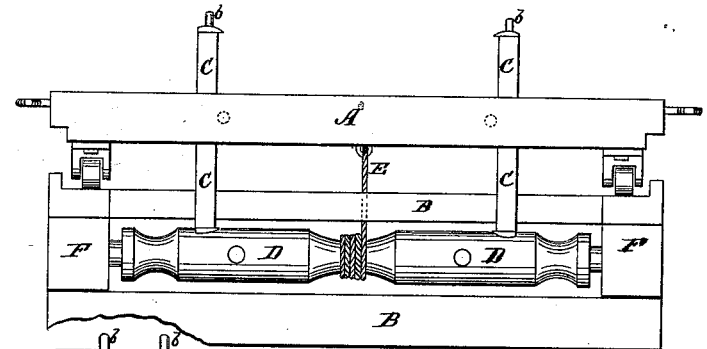
Figure 2:
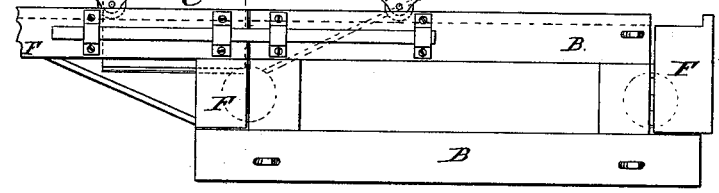
Figure 3:
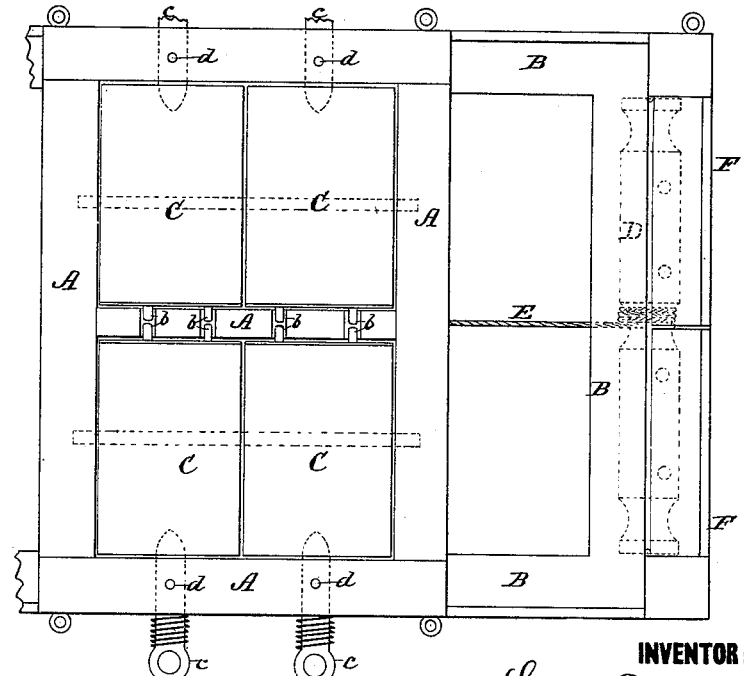

In the accompanying drawing, forming part of this specification, Figures 1 and 2 are respectively side and end views of the shifting platform and the frame on which it is supported, the cranes being extended laterally and the platform moved onto the same, and certain of the pivoted floor-sections tilted. Fig. 3 is a plan view, showing the said parts in the same position, except that the floor-sections are not tilted.

A indicates the rectangular shifting platform or wheeled truck, constituting the main feature of my invention. This false platform is intended to be of the same dimensions exteriorly as the frame or true platform of gondola-cars, and is secured thereto, except when discharging its load, by means of stakes or other suitable devices. Instead, however, of applying the shifting platform A directly to the cars themselves—that is to say, in place of supporting it directly upon the true platforms of the cars—I may apply it to an intermediate detachable frame, B, which is suitably secured to the true platform by stakes or other devices.

The false or movable platform A has a series of tilting floor-sections or traps, C, which are pivoted by gudgeons located at points slightly removed from the lengthwise middle of the sections, and are supported in the normal or horizontal position by means of fixed arms $b$, projecting from one end, and by movable spring locking-pins $c$ at the other end. On each side of each car, or else on each side of the detachable frame B, is located a windlass, D, from which ropes E extend to the shifting platform A, the same passing underneath the car-body or underneath the said frame B, as the case may be. The windlass is placed in a recess in the side of the car or detachable frame, so as to be easily accessible, and yet be out of the way of passing objects.

It is obvious that by rotating the windlass the rope E will be moved on or off the same, and the truck A will be moved laterally in one direction or the other.

Cranes F are hinged to the side of the car proper, or else to the side of the frame B, in such manner that they may be extended laterally to form supports for the truck A while unloading. The freight is loaded on the platform or trucks A in the usual way, and when the cars arrive at their destination the cranes F are swung laterally into the position shown in Figs. 1 and 2; and, the stakes or other fastening devices being withdrawn or detached, the trucks are moved laterally by aid of the windlass D and rope E until those sections or traps C which are ranged along one side of the platform overhang the side of the car, as in the several figures. The spring-pins $c$ are then drawn back and pins inserted in holes $d$ to hold the springs retracted, whereupon the traps will tilt automatically, as shown in Fig. 2, and discharge downward the freight resting thereon. In order to discharge the freight resting on the other traps, C, which are ranged along the other side of the platform A, the latter may be shifted to the other side of the car proper or the frame B. When the freight has been discharged the tilting sections are raised to the horizontal position, and again locked by pins c. The platform is then moved back and secured in its place on the car, and the cranes F are folded against the side of the car proper or frame B, as the case may be. The next car is then moved up to the proper place, and its freight discharged in the same manner. Thus the operation of unloading gondola-cars—loaded with stone, pig iron, or other freight not liable to injury by dumping—which is usually a tedious and laborious operation, requiring considerable time and several hands, may be easily and quickly performed by means of my invention by one, or at most two, hands. The economy of time thus effected, which is important in any business, is especially so in railroading, and enables the class of freights referred to be carried at considerably lower rates and delivered in correspondingly quicker time.

What I claim is—

1. The movable or shifting platform for gondola-cars, having a series of pivoted tilting floor-sections or traps, and the cranes or lateral supports for the same, combined substantially as shown and described.

2. The combination of the movable or shifting truck having the tilting floor-sections, the supplementary or intermediate frame B, for supporting the same, and the cranes hinged in the manner described to form a lateral support, as and for the purpose specified.

LOUIS PRINCE.

Witnesses:
AMOS W. HART,
CHAS. A. PETTIT.